US011504736B2

United States Patent
Hartmeier et al.

(10) Patent No.: US 11,504,736 B2
(45) Date of Patent: Nov. 22, 2022

(54) SYSTEMS AND METHODS FOR CLOSED LOOP FLUID VELOCITY CONTROL FOR JETTING

(71) Applicant: NORDSON CORPORATION, Westlake, OH (US)

(72) Inventors: Gregory L. Hartmeier, San Diego, CA (US); Alan R. Lewis, Carlsbad, CA (US); Yuriy Suhinin, San Diego, CA (US)

(73) Assignee: Nordson Corporation, Westlake, OH (US)

( * ) Notice: Subject to any disclaimer, the term of this patent is extended or adjusted under 35 U.S.C. 154(b) by 212 days.

(21) Appl. No.: 16/759,132

(22) PCT Filed: Oct. 26, 2018

(86) PCT No.: PCT/US2018/057619
§ 371 (c)(1),
(2) Date: Apr. 24, 2020

(87) PCT Pub. No.: WO2019/084348
PCT Pub. Date: May 2, 2019

(65) Prior Publication Data
US 2020/0338585 A1    Oct. 29, 2020

Related U.S. Application Data

(60) Provisional application No. 62/578,253, filed on Oct. 27, 2017.

(51) Int. Cl.
*B05C 11/10*    (2006.01)
*G01F 25/00*    (2022.01)
(Continued)

(52) U.S. Cl.
CPC ........ *B05C 11/1034* (2013.01); *B05C 5/0225* (2013.01); *B05C 11/1026* (2013.01); *G01F 25/0092* (2013.01); *B41J 29/393* (2013.01)

(58) Field of Classification Search
None
See application file for complete search history.

(56) References Cited

U.S. PATENT DOCUMENTS

| 3,907,429 A | 9/1975 | Kuhn et al. |
| 4,045,770 A | 8/1977 | Arnold et al. |

(Continued)

FOREIGN PATENT DOCUMENTS

| EP | 1479451 | * 11/2004 | ........... G05D 7/0629 |
| EP | 1479451 A2 | 11/2004 | |

(Continued)

OTHER PUBLICATIONS

JetXpert, Introducing the Inline JetXpert, https://jetxpert.com, webpage accessed Aug. 25, 2020.

*Primary Examiner* — Paul M. West
*Assistant Examiner* — Mark A Shabman
(74) *Attorney, Agent, or Firm* — BakerHostetler

(57) ABSTRACT

Systems and methods for closed loop fluid velocity control for jetting are disclosed. A method includes dispensing a first volume of viscous fluid from a nozzle of a dispensing device according to a first value of an operating parameter that affects the exit velocity of the first volume. A characteristic of the first volume is measured using a sensor. The characteristic of the first volume is then compared to a range of values to determine whether the characteristic of the first volume is outside of the range. The value of the operating parameter is adjusted to a second value in response to determining that the characteristic of the first volume is outside the range. A second volume of viscous fluid is dispensed according to the second value of the operating (Continued)

parameter. The exit velocity of the second volume is different than the first volume.

18 Claims, 9 Drawing Sheets

(51) Int. Cl.
*B05C 5/02* (2006.01)
*B41J 29/393* (2006.01)

(56) References Cited

U.S. PATENT DOCUMENTS

| | | |
|---|---|---|
| 4,935,261 A | 6/1990 | Srivastava et al. |
| 5,711,989 A | 1/1998 | Ciardella et al. |
| 6,213,356 B1 | 4/2001 | Nakasu et al. |
| 2007/0090126 A1 | 4/2007 | Tanaka et al. |
| 2012/0240658 A1 | 9/2012 | Tracy |
| 2012/0285990 A1* | 11/2012 | Abernathy ............ B05C 5/0225 222/1 |
| 2014/0060144 A1 | 3/2014 | Bloom et al. |
| 2016/0005668 A1* | 1/2016 | Donner ................. G01G 17/06 222/1 |
| 2016/0031030 A1 | 2/2016 | Bergstrom et al. |
| 2017/0182578 A1 | 6/2017 | Bergstrom et al. |

FOREIGN PATENT DOCUMENTS

| | | |
|---|---|---|
| WO | 2014/139568 A1 | 9/2014 |
| WO | 2017/160695 A2 | 9/2017 |

* cited by examiner

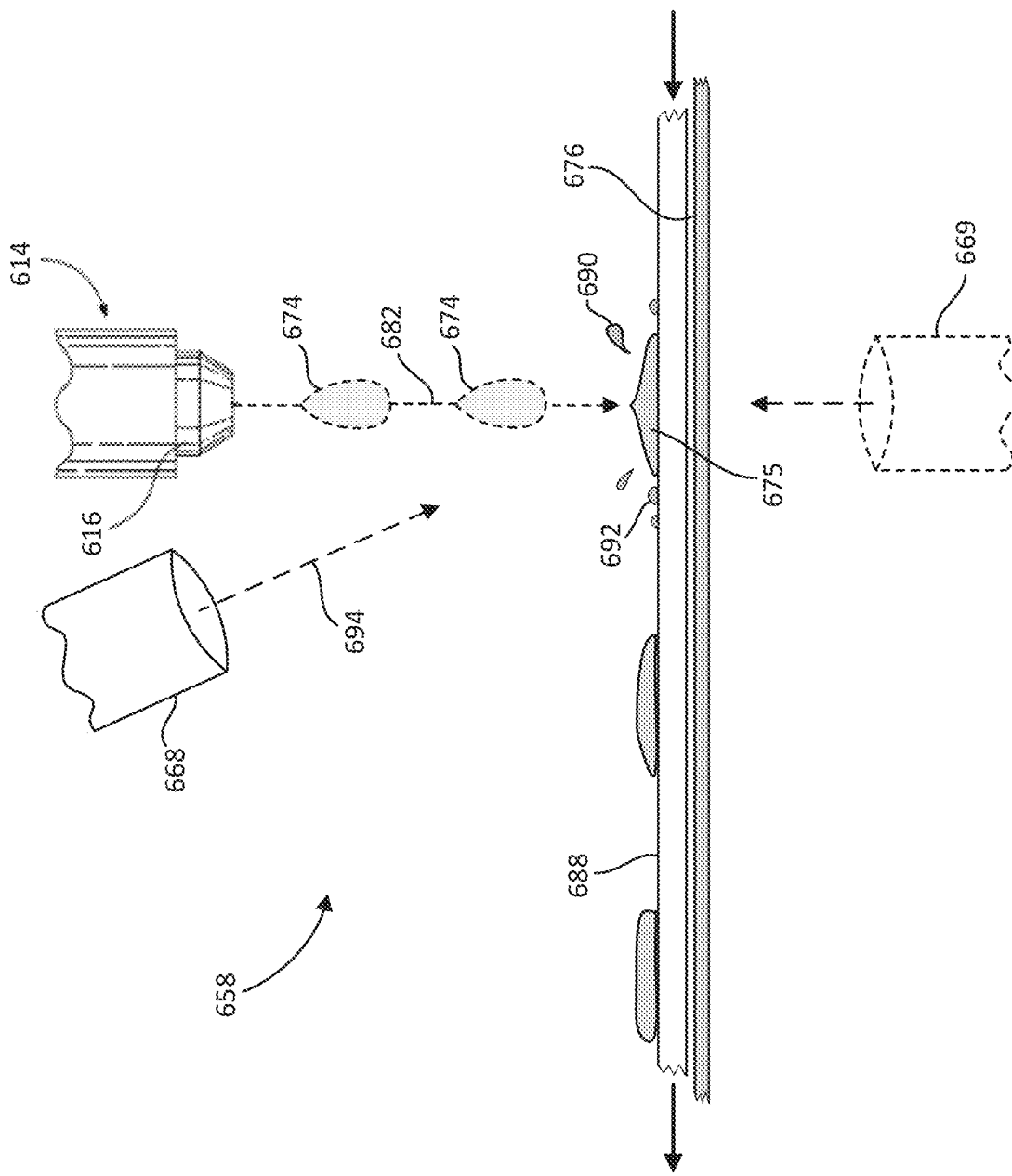

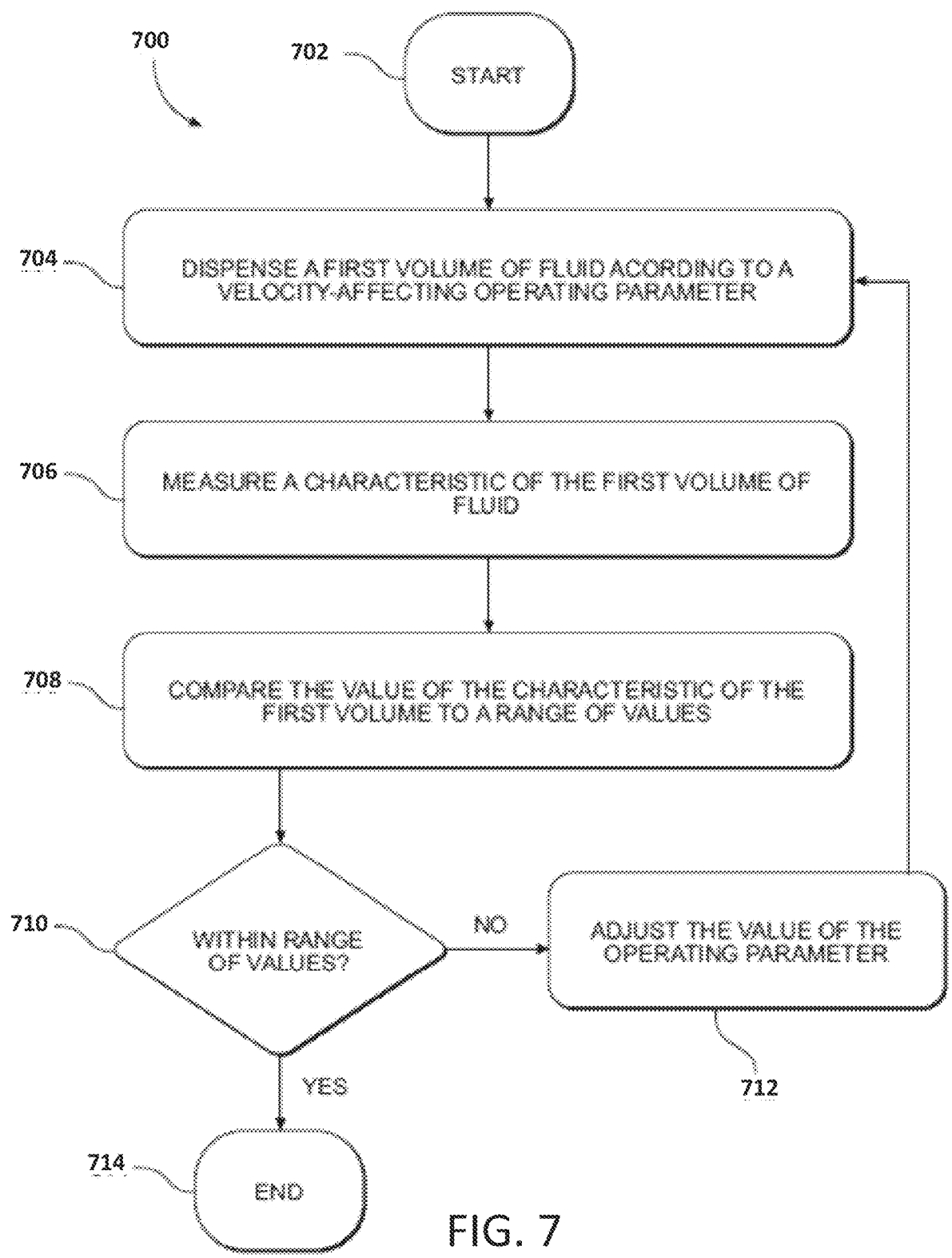

SYSTEMS AND METHODS FOR CLOSED LOOP FLUID VELOCITY CONTROL FOR JETTING

CROSS REFERENCE TO RELATED APPLICATIONS

This application is a National Stage Application of International Patent App. No. PCT/US2018/057619, filed Oct. 26, 2018, which claims the benefit of U.S. Provisional Patent App. No. 62/578,253, filed Oct. 27, 2017, the entire disclosures of both of which are hereby incorporated by reference as if set forth in their entirety herein.

TECHNICAL FIELD

This invention relates generally to the jetting of fluid materials and, in particular, to jetting valves, jetting systems, and improved jetting methods with adjustable operating parameters.

BACKGROUND

Jetting valves are used in electronic packaging assembly, as well as other processes, to jet minute dots or droplets, stream or discontiguous volume of a viscous or fluid material onto a substrate. Numerous applications exist for jetting valves that jet fluid materials, such as those concerning underfill materials, encapsulation materials, surface mount adhesives, solder pastes, conductive adhesives, and solder mask materials, fluxes, and thermal compounds.

A "jetting valve" or "jetting device" is a device which ejects, or "jets", a droplet, stream or discontiguous volume of material from the jetting device to land on a substrate, wherein the droplet, stream or discontiguous volume may disengage from the nozzle of the jetting device before making contact with the substrate. Thus, in this type of jetting device, the droplet, stream or discontiguous volume of material may be dispensed "in-flight" between the jetting device and the substrate, and not in contact with either the jetting device or the substrate, for at least a part of the distance between the jetting device and the substrate.

A jetting device may also refer to a device that ejects a droplet, stream or discontiguous volume of material such that the droplet, stream or discontiguous volume of material is in contact with the nozzle and the substrate simultaneously. The momentum of the fluid may be the primary factor for transporting the fluid from the nozzle to the substrate, as well as the primary mechanism for causing the separation of the droplet, stream or discontiguous volume of material from the nozzle. In this case, the material is delivered to the substrate without depending on adhesion of the droplet, stream or discontiguous volume of material to the substrate to pull the droplet, stream or discontiguous volume of material away from the nozzle of the jetting device.

Yet a dispensing device, including a jetting or similar device, may suffer from degraded or non-conforming performance in one or more aspects. One such performance aspect relates to the various dimensional and directional characteristics of the volumes of fluid dispensed by the device. For example, the volumes of fluid may develop an undesirable shape or may travel in an atypical direction. In other instances, a dispensing device may have sat idle for an extended period of time and requires calibration before entering service.

The activities required to perform such calibration and/or correction of the undesirable characteristics of the fluid volumes may prove time consuming and require significant human intervention. These and other shortcomings are addressed in the present disclosure.

SUMMARY

In one aspect, a method may include dispensing a first volume of viscous fluid from a nozzle of a dispensing device according to a first value of an operating parameter that affects the exit velocity of the first volume. A characteristic of the first volume may be measured using a sensor. The characteristic of the first volume may be compared to a range of values to determine whether the characteristic of the first volume is outside of the range. The value of the operating parameter may be adjusted to a second value in response to determining that the characteristic of the first volume is outside the range. A second volume of viscous fluid may be dispensed according to the second value of the operating parameter. The exit velocity of the second volume may be different than the first volume.

In another aspect, a dispensing system may include a sensor and a controller. The sensor may be arranged to measure a characteristic of a volume of viscous fluid dispensed by a dispensing device. The controller may be configured to generate one or more signals. The one or more signals may cause a valve of the dispensing device to be opened and closed to dispense a first volume of viscous fluid from the dispensing device. The dispensing may be performed according to a first value of an operating parameter. The value of the operating parameter may affect the exit velocity of the first volume. The one or more signals may cause information concerning a characteristic of the first volume to be generated using the sensor. The one or more signals may cause the information concerning the characteristic of the first volume to be compared to a range to determine whether the characteristic of the first volume is outside of the range. The one or more signals may cause the value of the operating parameter to be adjusted to a second value in response to a determination that the characteristic of the first volume is outside of the range. The one or more signals may further cause the dispensing device to dispense a second volume of viscous fluid according to the second value of the operating parameter. The exit velocity of the second volume may be different from the exit velocity of the first volume.

In another aspect, a method may include applying a first volume of viscous fluid to a first substrate and from a nozzle of a dispensing device according to a first value of an operating parameter that affects the exit velocity of the first volume. A characteristic of the first volume applied to the first substrate may be measured using a sensor. The characteristic of the first volume applied to the first substrate may be compared to a range of values to determine whether the characteristic of the first volume applied to the first substrate is outside of the range. The value of the operating parameter may be adjusted to a second value in response to determining that the characteristic of the first volume applied to the first substrate is outside the range. A second volume of viscous fluid may be applied to at least one of the first substrate and a second substrate according to the second value of the operating parameter. The exit velocity of the second volume may be different than the first volume.

BRIEF DESCRIPTION OF DRAWINGS

The accompanying drawings, which are incorporated in and constitute a part of this specification, illustrate embodiments and together with the description, serve to explain the principles of the methods and systems:

FIG. 6 illustrates a side view of an example velocity calibration station of the service station of FIG. 2.

FIG. 7 illustrates a flow chart of an example method.

DETAILED DESCRIPTION

The systems and methods of the present disclosure relate to a closed loop fluid velocity control for jetting. In an embodiment, the disclosed closed loop process may be used to correct an undesirable or incorrect characteristic of a volume of viscous fluid that is being dispensed. Some example characteristics of a volume of viscous fluid may include the volume's width, length, shape, velocity, and directionality. The process leverages one or more adjustments to various operating parameters of the dispensing device to affect the velocity at which the volume of fluid exits the dispensing device. The velocity of the fluid volume, in turn, may alter the characteristic of the volume of fluid to which the particular implementation of the closed loop process is directed.

Thus, as a volume of fluid is dispensed from the dispensing device, which is performed according to the velocity-affecting operating parameter, a characteristic of the fluid volume may be measured by an appropriately positioned sensor (e.g., a camera). If the characteristic of the fluid volume is at or sufficiently near a target value, the dispensing device may then be put back into service. If not, the operating parameter may be adjusted and another volume of fluid may be dispensed, but now using the adjusted operating parameter. The fluid volume may exit the dispensing device at a new exit velocity, which is due to the newly-adjusted operating parameter. The characteristic of that volume of fluid may again be measured and is, preferably, at or near the target value. If not, the process may be reiterated until the characteristic of the fluid volume converges on the target value.

Figure 1A:
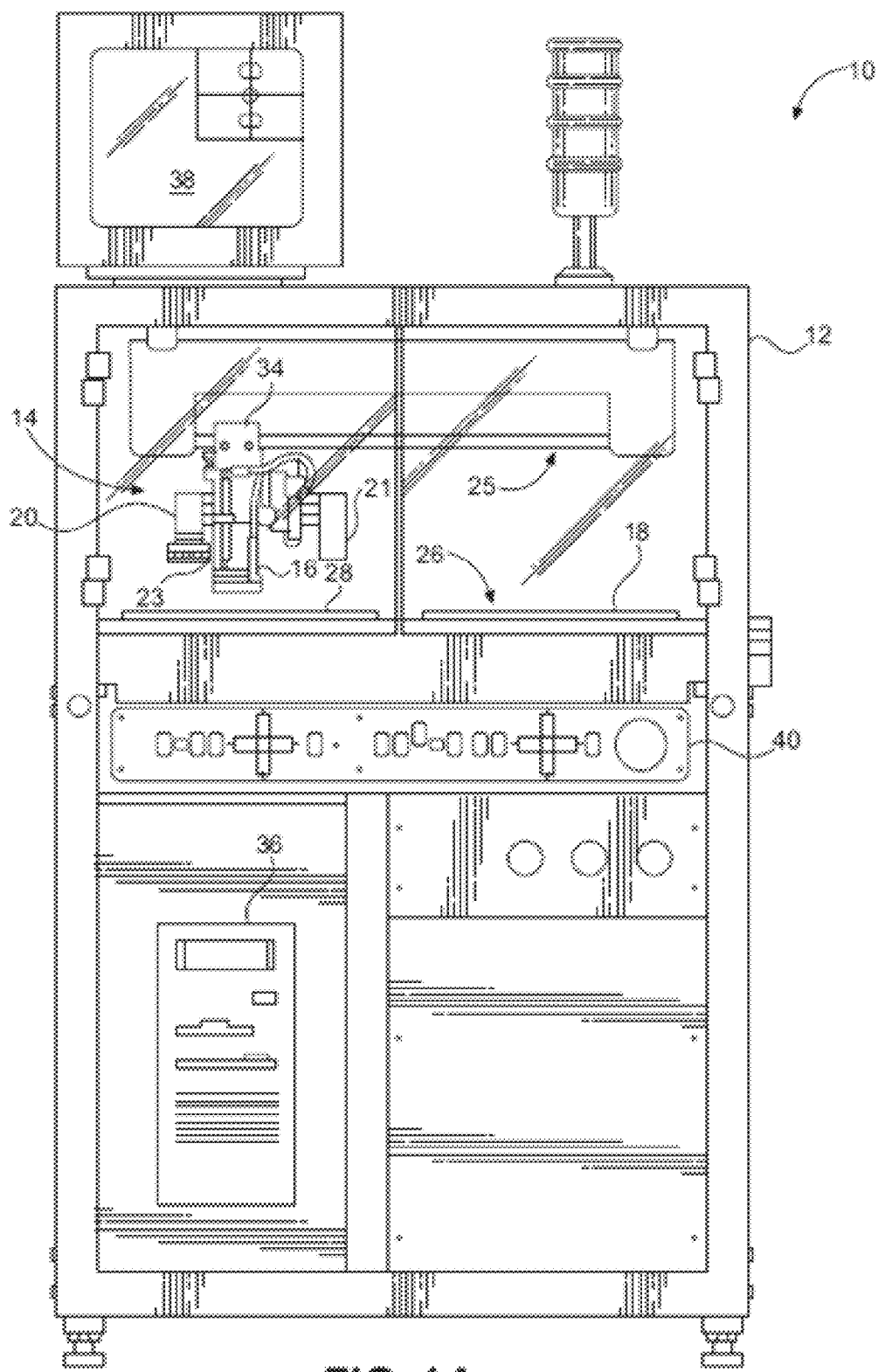
FIG. 1A illustrates an example dispensing system.

FIG. 1A illustrates an example dispensing system 10 including a cabinet 12 and a dispensing assembly 14. The dispensing assembly 14 may include a dispensing nozzle 16 having a valve for selectively dispensing controlled amounts of fluid or viscous material onto a substrate 18 (e.g., a circuit board or other customer product) positioned on a production area 26 of the cabinet 12. The dispensing nozzle 16 may perform a dispensing operation (i.e., opening and closing the valve of the dispensing assembly 14) while the dispensing assembly 14 is stationary, including dispensing a continuous stream or a discontinuous series of fluid volumes. Additionally or alternatively, the dispensing nozzle 16 may perform a dispensing operation (i.e., opening and closing the valve of the dispensing assembly 14) while the dispensing assembly 14 is moving, including dispensing a continuous stream or a discontinuous series of fluid volumes.

The dispensing assembly 14 may also include a camera 20 and a height sensor 21. The dispensing nozzle 16 may be a needle dispenser, a spray dispenser, a jetting dispenser, or any other device suitable for dispensing fluid or viscous materials such as adhesives, epoxies, or solder pastes onto the substrate 18 from a fluid material reservoir 23. The dispensing assembly 14 may be coupled to a positioner 25 configured to selectively position the dispensing assembly 14 above the production area 26 and a service station 28 (i.e., a service area) of the cabinet 12. The positioner 25 may be a three-axis positioner that includes independently controllable x-axis and y-axis drives configured to move the dispensing assembly 14 in a horizontal plane above the production area 26 and/or the service station 28, and adjust the height of the dispensing assembly 14 and/or dispensing nozzle 16 relative to the surface of the production area 26 and/or the service station 28. The positioner 25 may thereby provide three substantially perpendicular axes of motion for the dispensing assembly 14. Although the dispensing assembly 14 is shown in the illustrated embodiment as being coupled to an x-y positioner by a z-axis drive 34, persons having ordinary skill in the art will understand that other mechanisms could be used to position the dispensing assembly 14.

The dispensing system 10, in particular the dispensing assembly 14, may operate according to one or more operating parameters, some of which may materially affect a velocity of a dispensed fluid volume from the dispensing nozzle 16. Thus, an adjustment to the values of these operating parameters may cause a corresponding change in the velocity of subsequent fluid volumes from the dispensing nozzle 16. As will be explained in greater detail herein, these changes in velocity may impact other characteristics of the dispensed fluid volumes, such as shape, width, length, and directionality of the fluid volumes. Operating parameters that may materially affect fluid velocity may include the speed and/or a stroke length of a needle, valve stem, or other movable element configured to engage a valve seat. Other examples may relate to an actuation profile, such as actuation timing, the stroke length of the actuator, and/or other attributes.

The dispensing system 10 may also include a controller 36, which may be a computer mounted in the cabinet 12 or may be remote. The controller 36 may be configured to provide overall control of the dispensing system 10, such as coordinating movements of the dispensing assembly 14, actuating the dispensing nozzle 16, and/or actuating components of the service station 28. The controller 36 may include a processor, a memory, and an input/output (I/O) interface. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory. The memory may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing digital information. The memory may also include a mass storage device (not shown) such as a hard drive, optical drive, tape drive, non-volatile solid state device or any other device capable of storing digital information. The processor may operate under the control of an operating system that resides in memory. The operating system may manage controller 36 resources so that computer program code embodied as one or more computer software applications.

A user interface 38 and/or a control panel 40 may be communicatively connected to the controller 36 to allow a system operator to interact with the controller 36. The user interface 38 may include a video monitor, alphanumeric displays, a touch screen, a speaker, and any other suitable audio and/or visual indicators capable of providing information to the system operator. The control panel 40 may include one or more input devices capable of accepting commands or input from the operator, such as an alphanumeric keyboard, a pointing device, keypads, pushbuttons, control knobs, microphones. In this way, the user interface 38 and/or the control panel 40 may enable manual initiation of system functions, for example, during set-up, calibration, inspection, and/or cleaning.

Figure 1B:
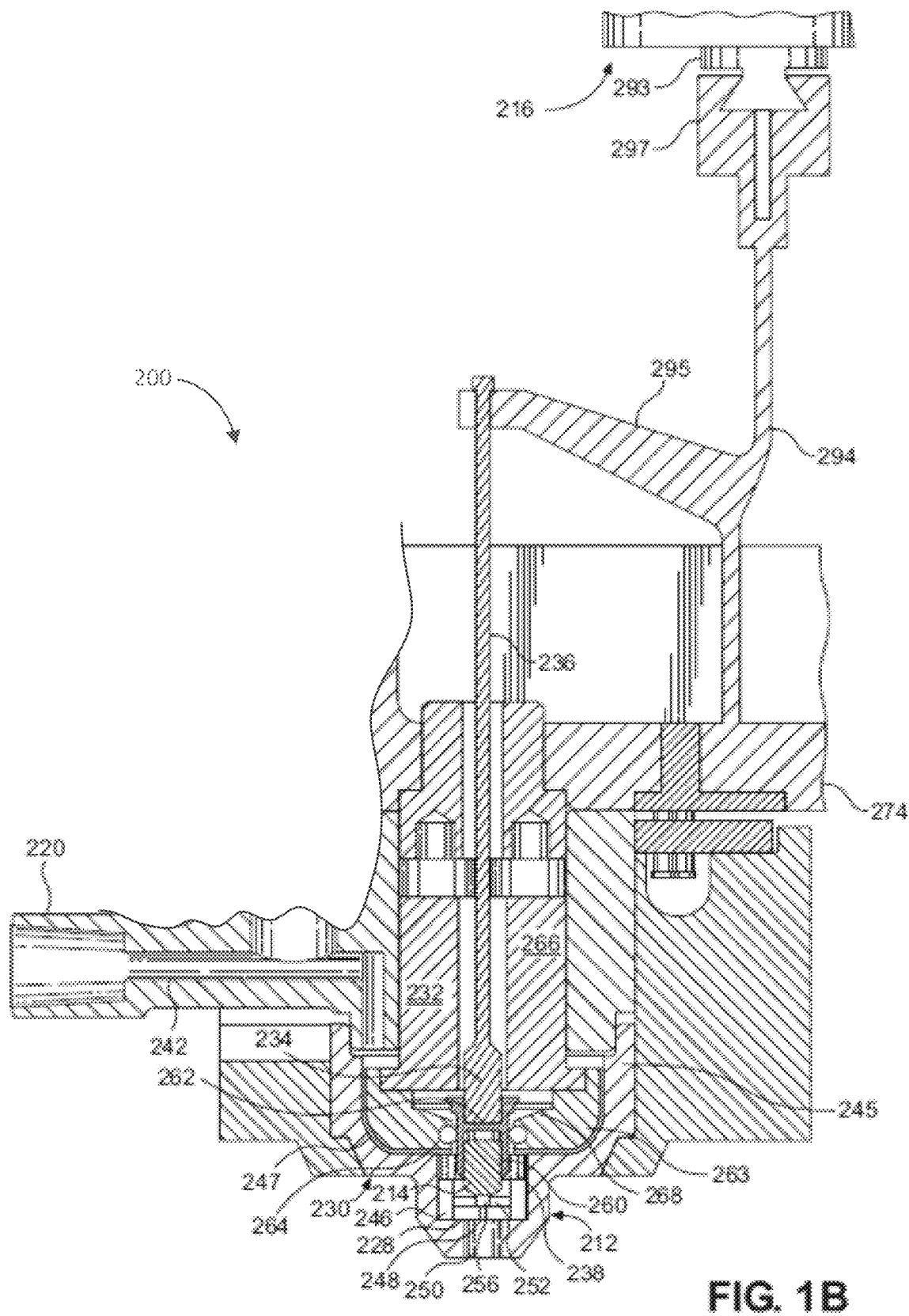
FIG. 1B illustrates a cross-sectional view of an example dispensing assembly usable with the dispensing system of FIG. 1A.

FIG. 1B illustrates an example dispensing assembly 200, which may realize the dispensing assembly 14 of FIG. 1A. The dispensing assembly 200 includes a fluid module 212 having a fluid connection interface 220, a valve element 214, a piezoelectric drive module 216, a movable needle or drive pin 236 coupled with the piezoelectric drive module 216, and an outer cover (not shown) housing the piezoelectric drive module 216. The dispensing assembly 200 may operate as a jetting dispenser that intermittently jets amounts of a fluid material onto a substrate and may be moved relative to the substrate as the amounts of fluid material are jetted. The dispensing assembly 200 may be operated such that a succession of jetted amounts of the fluid material are deposited on the substrate as a line of spaced-apart material dots. The substrate targeted by the dispensing assembly 200 may support various surface mounted electronic components, which necessitates non-contact jetting of the minute amounts of fluid material rapidly and with accurate placement to deposit fluid material at targeted locations on the substrate.

The fluid module 212 includes a nozzle 228, a module body 230, and a fluid chamber 238 in communication with the fluid connection interface 220. A first section or portion of the module body 230 includes a fluid inlet 242 and a passageway 247 that couples the fluid inlet 242 in fluid communication with the fluid chamber 238. A fluid conduit (not shown) extends from the fluid source (e.g., a pressurized fluid source) to the fluid inlet 242 for placing the fluid module 212 in fluid communication with the fluid material contained inside the fluid source and for supplying the fluid material under pressure from the fluid source to the fluid connection interface 220. In this embodiment, the fluid conduit is typically a length of tubing directly connecting the outlet of the fluid source with the fluid connection interface 220 without any intervening structure. In one embodiment, the fluid connection interface 220 includes a Luer fitting.

A second portion 245 of the module body 230 is configured to support the nozzle 228. A centering piece 246 aligns a fluid outlet 248 in the nozzle 228 with a passageway 250 extending through the second portion 245 of the module body 230. A valve seat 252 is disposed between the fluid inlet 242 and the fluid outlet 248. The valve seat 252 has an opening 256 in fluid communication with the fluid outlet 248. The centering piece 246 maintains the fluid outlet 248 in the nozzle 228, the passageway 250 in the second portion 245 of module body 230, and the opening 256 in the valve seat 252 in a concentric alignment.

The dispensing assembly 200 further includes a strike plate in the form of a wall 262 of a movable element 260. A biasing element 268, which peripherally contacts the movable element 260, is configured to apply an axial spring force to the movable element 260.

A sealing ring 264 supplies a sealing engagement between an insert 263 and the exterior of the movable element 260. The part of the moveable element 260 which is below the sealing ring, or O-ring, 264 defines a part of the boundary of the fluid chamber 238. The movable element 260 comprises the valve element 214. The valve element 214 is located inside the fluid chamber 238 at a location between the wall 262 of the movable element 260 and the valve seat 252.

The drive pin 236 projects through a bore 266 in a third portion 232 of the fluid module body 230. The tip 234 of the drive pin 236 is located adjacent to the wall 262 of the movable element 260 and on an opposite side of the wall 262 from the valve element 214. While the valve element 214 is exposed to the fluid material contained inside the fluid chamber 238, the bore 266 containing the drive pin 236 is isolated from the fluid material in fluid chamber 238 so that the drive pin 236 is not wetted by the fluid material. As a result, the construction of the modular jetting device 210 can omit the conventional fluid seals that permit powered motion of the drive pin 236 while isolating the driving or actuation mechanism (e.g., the piezoelectric drive module 216) for the drive pin 236 from the fluid material in the fluid chamber 238.

The drive pin 236 is indirectly coupled with the valve element 214 and operates as a component of the piezoelectric drive module 216 or other drive module. The drive pin 236 and valve element 214 jointly cooperate to dispense fluid material by jetting from the modular jetting device 210. When the drive pin 236 is moved to cause the valve element 214 to contact the valve seat 252, the tip 234 of the drive pin 236 operates much like the operation of a hammer by striking the wall 262 of the movable element 260 to transfer its force and momentum to the wall 262, which in turn causes the valve element 214 to rapidly strike the valve seat 252 and jet a droplet, stream or discontiguous volume of material from the jetting device. Specifically, the valve element 214, which is not directly connected with the drive pin 236, is configured to be moved into contact with the valve seat 252 by an impulse imparted by the tip 234 of the actuated drive pin 236 to the wall 262 of the movable element 260. As a result, the drive pin 236 is actuated and an amount fluid material is jetted from the fluid chamber 238 without any portion of the drive pin 236, including but not limited to the tip 234, being wetted by the jetted fluid material. When contact between the drive pin 236 and wall 262 is removed, the axial spring force applied by the biasing element 268 acts to move the valve element 214 and movable element 260 away from the valve seat 252 in a direction aligned with the longitudinal axis of the drive pin 236. Each reciprocating cycle of the drive pin 236 and valve element 214 jets a droplet, stream or discontiguous volume of the fluid material. The cycle is repeated to jet sequential droplets of fluid material as required.

The surface of the valve element 214 facing the valve seat 252 may have a curvature to match the shape of the surface of the valve seat 252 encircling opening 254. As a result of the shape matching, a fluid seal is temporarily formed when the valve element 214 has a contacting relationship with valve seat 252 during jetting. Establishment of the fluid seal during motion of the valve element 214 halts the flow of fluid material from the fluid chamber 238 past the valve seat 252.

Figure 1C:
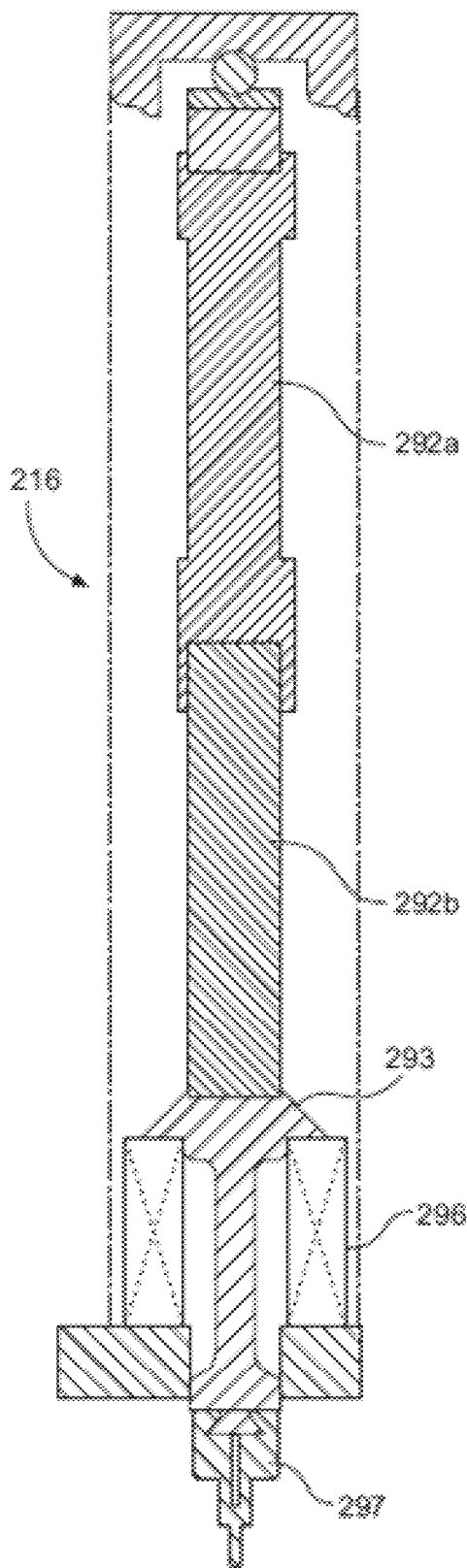
FIG. 1C illustrates a cross-sectional view of a piezoelectric drive module of the dispensing assembly of FIG. 1B.

FIG. 1C illustrates a detailed view of the piezoelectric drive module 216. The piezoelectric drive module 216 is used to actuate the valve element 214 of fluid module 212. The piezoelectric drive module 216 operates according to control signals from a controller (e.g., the controller 36 of FIG. 1A). In the present embodiment, the piezoelectric drive module 216 includes piezoelectric stacks 292a and 292b, a plunger 293, an asymmetrical flexure 294. The flexure 294 is an integral part of actuator body 274 and includes a coupling element 297 that connects the flexure 294 to the plunger 293. A spring 296 applies a spring force to the plunger 293 and the piezoelectric stacks 292a, 292b to keep them in compression.

The plunger 293 functions as a mechanical interface connecting the piezoelectric stack 292 with the asymmetrical flexure 294. The spring 296 is compressed in the assembly such that the spring force generated by the spring 296 applies a constant load on piezoelectric stack 292, which preloads the piezoelectric stack 292. The asymmetrical flexure 294, which may be comprised of a metal, has an arm 295 that is physically secured with an end of the drive pin 236 opposite to the tip 234 of drive pin 236. The asymmetrical flexure 294 functions as a mechanical amplifier that converts the relatively small displacement of the piezoelectric stack 292 into a useful displacement for the drive pin 236 that is significantly larger than the displacement of the piezoelectric stack 292.

The piezoelectric stack 292 of piezoelectric drive module 216 is a laminate comprised of layers of a piezoelectric ceramic that alternate with layers of a conductor as is conventional in the art. The spring force from spring 296 maintains the laminated layers of the piezoelectric stack 292 in a steady state of compression. The conductors in the piezoelectric stack 292 are electrically coupled with a driver circuit, which supplies current-limited output signals, in a manner well known in the art, with pulse width modulation, frequency modulation, or a combination thereof. When power is periodically supplied from the driver circuit 298, electric fields are established that change the dimensions of the piezoelectric ceramic layers in the piezoelectric stack 292.

The dimensional changes experienced by the piezoelectric stack 292, which are mechanically amplified by the asymmetrical flexure 294, move the drive pin 236 linearly in a direction parallel to its longitudinal axis. When the piezoelectric ceramic layers of the piezoelectric stack 292 expand, the spring 296 is compressed by the force of the expansion and the asymmetrical flexure 294 pivots about a fixed pivot axis to cause movement of the tip 234 of the drive pin 236 upward and away from the wall 262 of movable element 260. This allows the biasing element 268 to move the valve element 214 away from valve seat 252. When the actuation force is removed and the piezoelectric ceramic layers of the piezoelectric stack 292 are permitted to contract, the spring 296 expands and the asymmetrical flexure 294 pivots to move the drive pin 236 downward so that the tip 234 moves into contact with the wall 262, causing the valve element 214 to contact valve seat 252 and jet a droplet, stream or discontiguous volume of material. Thus, in the de-energized state, the piezo stack assembly maintains the valve in a normally closed position. In normal operation, the asymmetrical flexure 294 intermittently rocks in opposite directions about a fixed pivot axis as the stack 292a, 292b is energized and de-energized to move the tip 234 of drive pin 236 into and out of contact with the wall 262 of the movable element 260 to jet droplets of material at a rapid rate.

Figure 2:
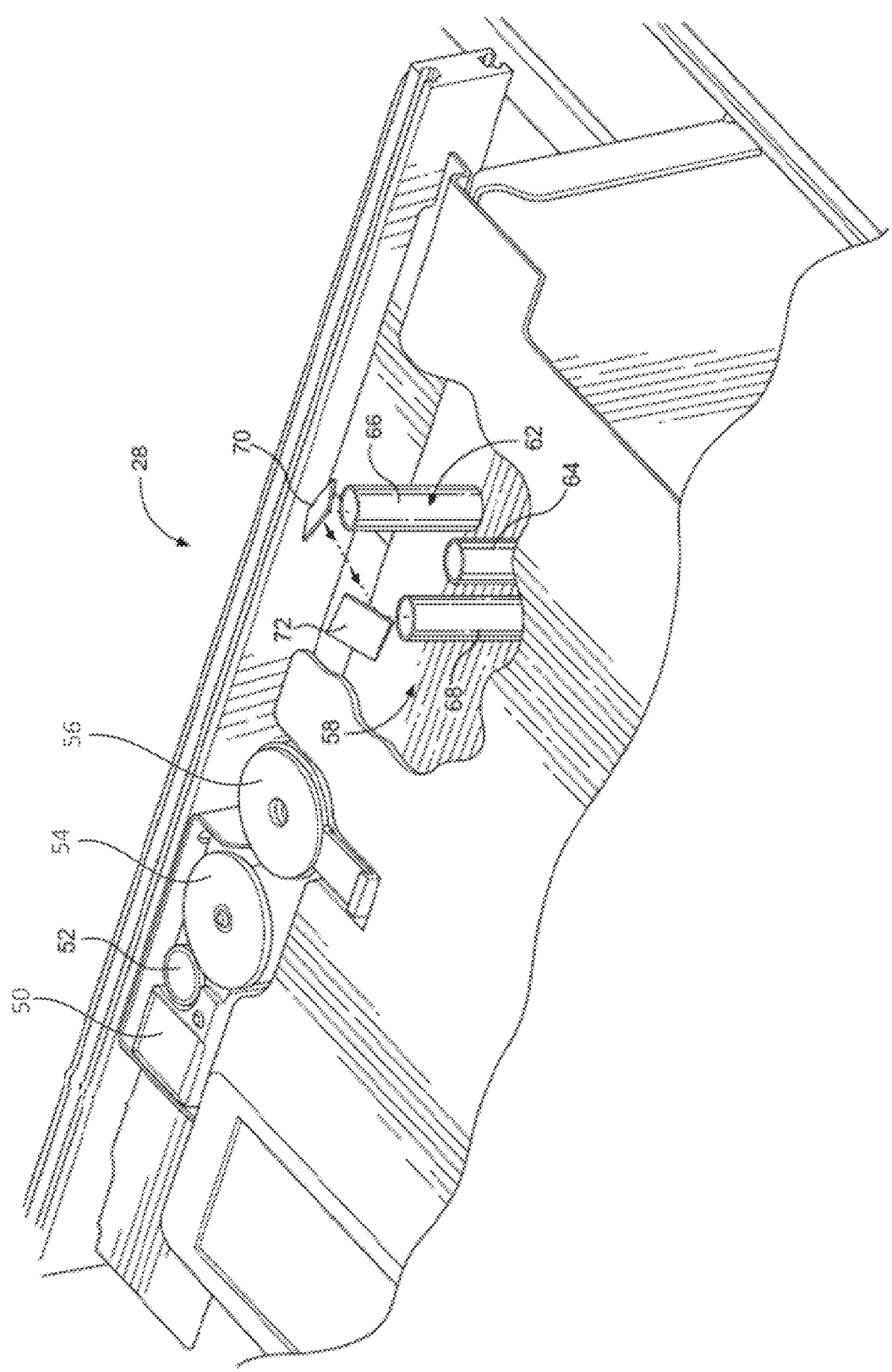
FIG. 2 illustrates an example service station of the dispensing system of FIG. 1A.

FIG. 2 illustrates an example service station 28 configured, among other functions, to measure a characteristic of a volume of fluid dispensed from the dispensing nozzle 16. As shown, the service station 28 may include a platform supporting one or more of a position calibration station 50, a touch sensor station 52, a purge station, a weighing station 56, and a velocity calibration station 58.

The position calibration station 50 may be configured to calibrate the x/y-position of the dispensing nozzle 16. For example, the position calibration station 50 may provide a fixed reference point that can be captured by the camera 20 and/or the height sensor 21, which generates a signal to the controller 36. The controller 36 may then calibrate the x/y-position of the camera and/or the height sensor 21 based on the signal.

The touch sensor station 52 may be configured to calibrate the z-position of the dispensing nozzle. For example, the dispensing nozzle 16 may be lowered toward the touch sensor station 52 until contact is initially sensed by a pressure sensitive region of the touch sensor station 52. Based on the initial contact by the dispensing nozzle 16, a signal is generated by the touch sensor station 52 and transmitted to the controller 36. The controller 36 may then calibrate the z-position of the dispensing nozzle 16.

The purge station 54 may be configured to remove waste material from the dispensing nozzle 16. For example, the purge station 54 include a source of vacuum configured to generate negative pressure to suck the fluid or viscous material and/or cleaning material from a surface of the dispensing nozzle. The vacuumed material may be deposited in a reservoir (not shown) positioned underneath the platform 48.

The weighing station 56 may be configured to calibrate the material of the dispensing system 10. For example, the weighing station 56 may include a scale configured to receive and weigh one or more droplets from the dispenser. The scale may then generate a signal indicative of the weight, which is transmitted to the controller 36. Based on the weight of the material, the controller 36 may calibrate the material deposited by the dispensing nozzle 16.

Figure 4:
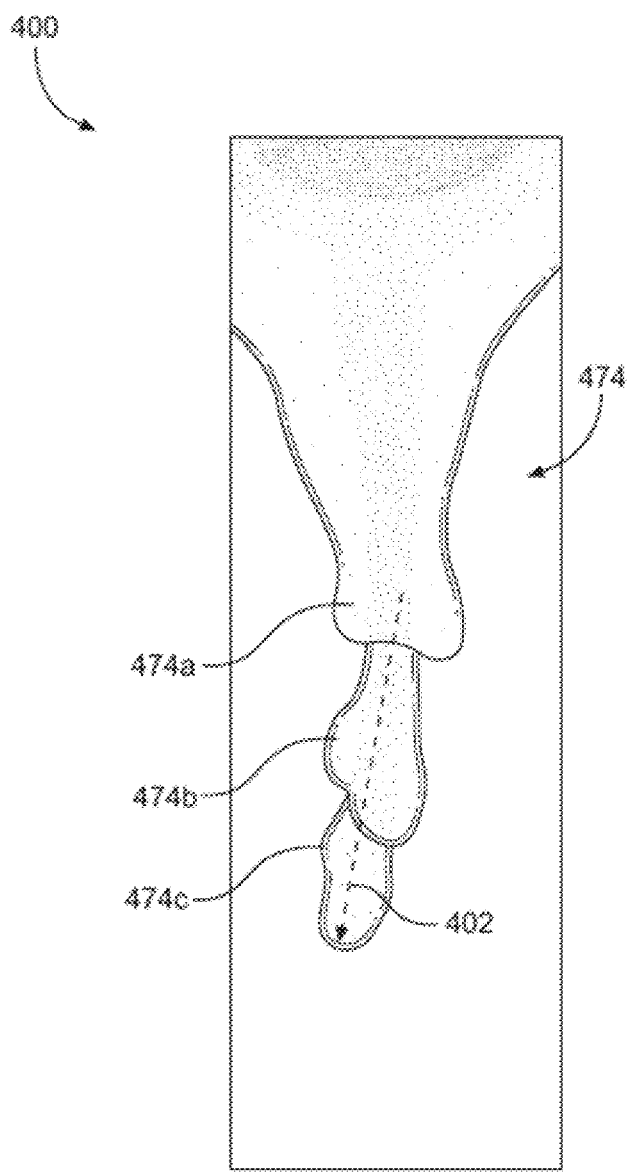
FIG. 4 illustrates an example image of a volume of fluid captured by a light sensor assembly.

The velocity calibration station 58 may be configured to measure a characteristic of a sampling of one or more fluid volumes as each fluid volume is dispensed from the dispensing nozzle 16. Example fluid volume characteristics may include velocity, width, diameter, length, shape, or directionality. The velocity calibration station 58 may include an imaging assembly 62 and a receptacle 64. The imaging assembly 62 may capture one or more images of the fluid volume while the fluid volume is in flight between the dispensing nozzle 16 and the receptacle 64. In some aspects, the imaging assembly 62 may capture one or more images of the fluid volume while the fluid volume is still in contact with the dispensing nozzle (as shown in FIG. 4). In the embodiment illustrated in FIG. 2, the imaging assembly 62 includes a light source 66 and a light sensor assembly 68 in opposing alignment with the light source 66. The light source 66 may intermittently strobe or project a beam of light across the flight path of the dispensed fluid volume. The light source 66 may be positioned such that the beams of light are normal to the flight path of the dispensed fluid volume. The light sensor assembly 68 may be positioned relative to the light source 66 to capture an image or other representation of the fluid volume as it passes through a beam of light from the light source 66. Although the imaging assembly 62 of the present embodiment is described in terms of a light source and light sensor assembly pairing, the imaging assembly 62 is not so limited and other types of apparatus may be used to measure or determine a characteristic of the fluid volume. Nor must the fluid volume characteristic be measured or determined using an imaging apparatus or technique per se.

Figure 5:
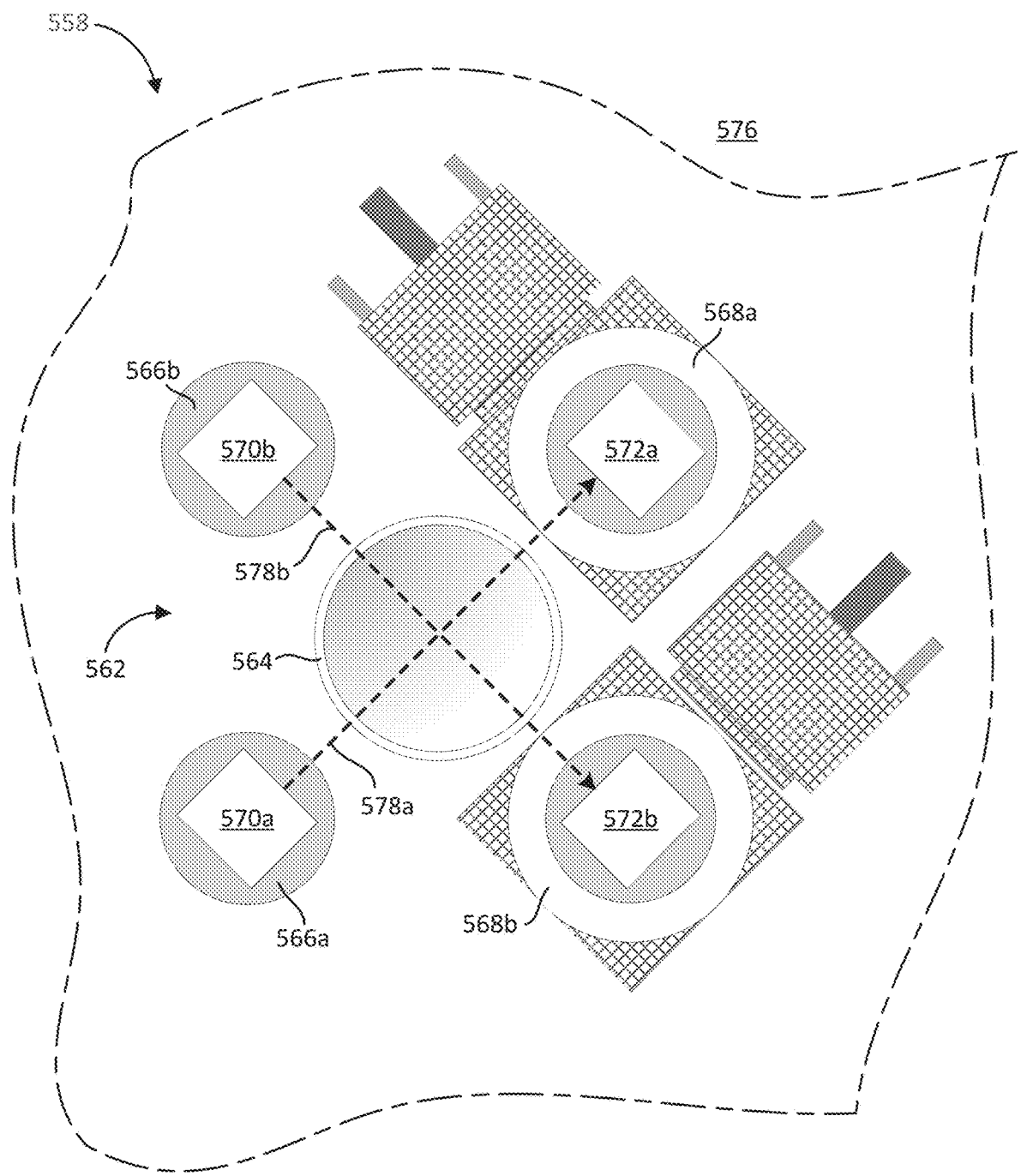
FIG. 5 illustrates a top down view of an example velocity calibration station of the service station of FIG. 2.

In other embodiments, the imaging assembly 62 may include multiple pairings of light sources 66 and light sensor assemblies 68. For example, the imaging assembly 62 may include a first pairing and a second pairing in an arrangement in which the light beam of the first pairing is normal to the light beam of the second pairing. An example of this type of imaging assembly 62 configuration is shown in FIG. 5.

The imaging assembly 62 may further include one or more angled mirrors, which may allow design flexibility in the arrangement of the imaging assembly 62 and the receptacle 64 within the service station 28. The light source 66, the light sensor assembly 68, or both may be positioned vertically within the service station 28 by virtue of one or more mirrors redirecting the light beam from the light source 66. For example, the imaging assembly 62 may include a first mirror 70 associated with the light source 66 and a second mirror 72 associated with the light sensor assembly 68. The first mirror 70 may be positioned relative to the light source 66 so that the light beam from the light source 66 is reflected through a travel path of a dispensed fluid volume. The second mirror 72 may be positioned to reflect the beam of light to the light sensor assembly 68.

As noted, the velocity calibration station 58 may further include a receptacle 64. The receptacle 64 may be configured to catch and retain the fluid volume after the fluid volume has passed through the beam(s) of light from the image assembly 62. It is contemplated that the fluid volume dispensed at the velocity calibration station 58 will be considered waste and, thus, the receptacle 64 may be removable and positioned for easy access.

The imaging assembly 62 may capture one or more images (or other representations) of a volume of fluid. The one or more images may be transmitted to the controller 36. The controller 36, in turn, may analyze the images and determine a value of the relevant characteristic of the fluid volume. In some aspects, a characteristic value for a sample of multiple fluid volumes may be an aggregate or average characteristic value of the multiple fluid volumes of the sample. A standard deviation may be determined based on the characteristic values of the multiple fluid volumes of the sample. In some embodiments, the images may be instead analyzed by the image assembly 62 to determine the characteristic values and those values may be transmitted to the controller 36.

In operation, with respect to the velocity calibration station 58, the dispensing system 10 may selectively operate in a production mode or a service mode. In the production mode, the dispensing assembly 14 may be positioned over the production area 26 and proximate (e.g., directly above) a substrate 18. In this position, the dispensing assembly 14 may dispense fluid onto the surface of the substrate 18. The dispensing assembly 14 may further dispense fluid onto the surface of successive substrates 18.

In the service mode, the dispensing operations of the production mode are suspended and the dispensing assembly 14 is positioned proximate the service station 28 and the velocity calibration station 58 in particular. The service mode may be initiated at pre-set intervals, in response to a detection of some deficient operational aspect of the dispensing system 10, or in response to a manual operator input, for example. In the service mode, the closed loop velocity calibration process, or portions thereof, may be performed. After the closed loop velocity calibration process, or portions thereof, is complete, the dispensing system 10 may re-enter the production mode and position the dispensing assembly 14 over a substrate 18 to process said substrate 18.

Figure 3:
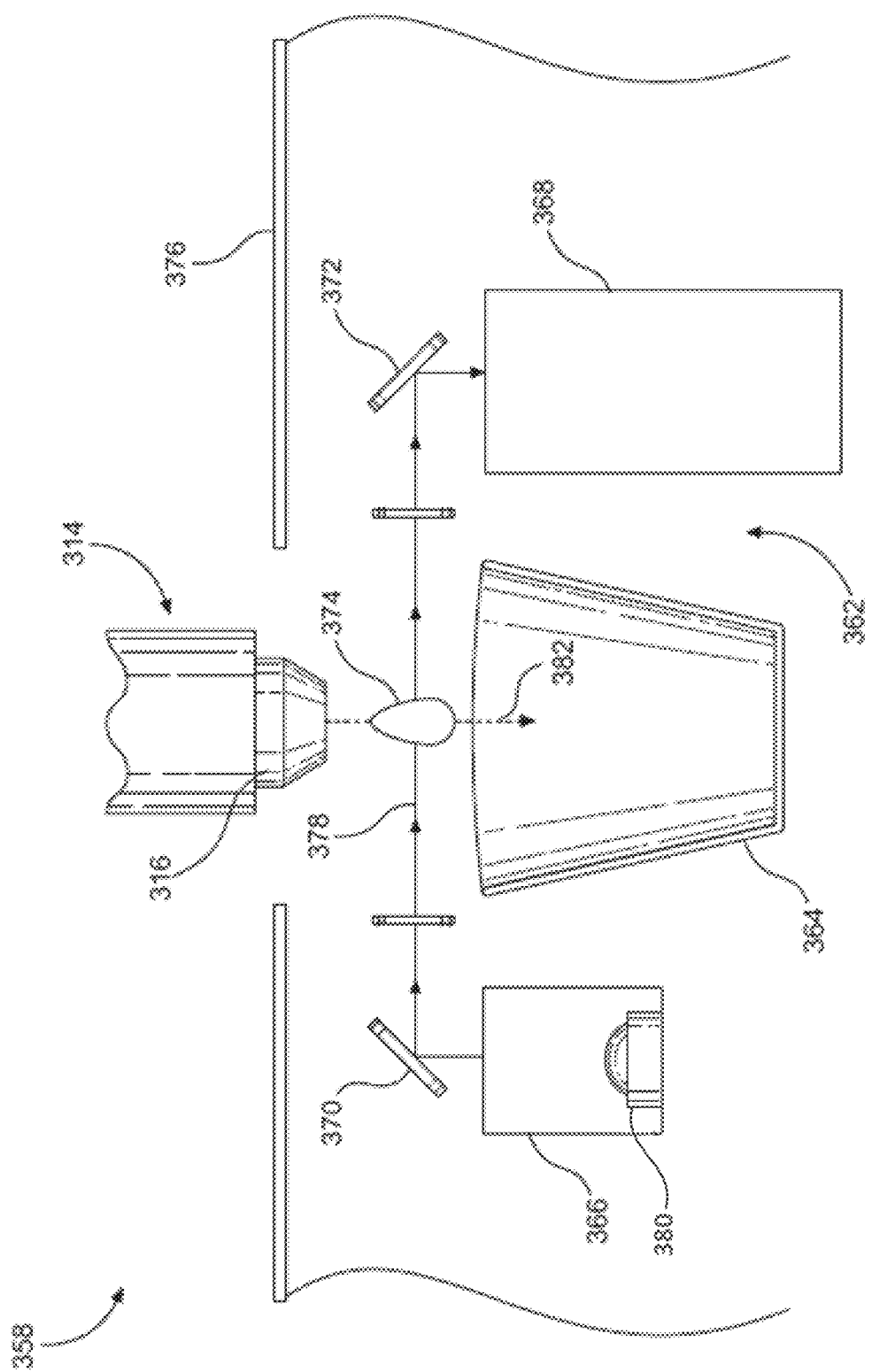
FIG. 3 illustrates a side view of an example velocity calibration station of the service station of FIG. 2.

FIG. 3 illustrates a side view of at least a portion of an example velocity calibration station 358. The velocity calibration station 358 includes an imaging assembly 362, a corresponding receptacle 364, and a dispensing assembly 314 with dispensing nozzle 316. The velocity calibration station 358, the imaging assembly 362, the receptacle 364, the dispensing assembly 314, and the dispensing nozzle 316 may be similar in some aspects with the velocity calibration station 58, the imaging assembly 62, the receptacle 64, the dispensing assembly 14, and the dispensing nozzle 16 of FIG. 1A, respectively.

The velocity calibration station 358 includes the imaging assembly 362 which comprises a light source 366 and a light sensor assembly 368. The light sensor assembly 368 may comprise a camera. A light emitting diode (LED) 380 may generate the light beam 378, which is projected by the light source 366. The light sensor assembly 368 and the light source 366 are arranged in opposing alignment of a flight path of a fluid volume 374 dispensed from the dispensing nozzle 316 of the dispensing assembly 314. The light sensor assembly 368 may capture one or more images of the fluid volume 374 as it is dispensed. In some aspects, the light sensor assembly 368 may capture a composite image comprising more than one representation of the fluid volume 374.

The light beam 378 may comprise an intermittent series or strobes of light from the light source 366. An intermittent or strobed light beam may allow the light sensor assembly 368 to capture the multiple representations of the fluid volume 374 as it passes through the light beam 378. The strobed light beam may be timed to synchronize with the valve opening and/or closing. There may be a repeatable delay between the time at which an open/close signal is sent to the valve and the time at which the fluid volume 374 exits the valve and/or ceases to exit the valve, respectively. In an example, the strobed light beam may be triggered by an open and/or close signal sent to the valve. An adjustable delay variable may be introduced, which may commence in response to the open/close signal. Upon expiration of the adjustable delay, the light beam 378 may be strobed. By this method, among others, the light beam 378 may pass through the fluid volume 374 while the fluid volume 374 is in transit to the subject substrate.

The multiple representations of the fluid volume 374 may aid the system in determining the directionality of the fluid volume 374 since the path of the fluid volume 374 may be plotted over the multiple representations. The multiple representations of the fluid volume 374 may further allow the system to analyze the development or change of the shape, width, and length of the fluid volume 374 as the fluid volume 374 passes through the light beam 378. If the time intervals between successive strobes of light are known, the velocity of the fluid volume 374 may be determined using the multiple representations of the fluid volume 374. Alternatively, the light beam 378 may represent a continuous projection of light from the light source 366. In this case, a high-speed video capture system may find use to capture imagery of the fluid volume 374 as it passes through the continuous light stream.

The light source 366 and the light sensor assembly 368 may each be vertically oriented within the calibration station, generally parallel to the direction of travel of the dispensed fluid volume 374, indicated by the arrow 382.

That is, the bodies of the light source 366 and the light sensor assembly 368 are oriented vertically. Further, the light beam 378 is vertically oriented (i.e., parallel with the fluid volume's 374 direction of travel in flight) as the light beam 378 is projected from the light source 366. The light beam 378 is also vertically oriented (i.e., parallel with the fluid volume's 374 direction of travel in flight) as it enters the light sensor assembly 368. The vertical orientation of the light source 366 and the light sensor assembly 368 may ease accommodation of the light source 366 and the light sensor assembly 368 within the cabinet 12.

To facilitate the vertical orientation of the light source 366 and the light sensor assembly 368, a first angled mirror 370 reflects the light beam 378 from the light source 366 in a horizontal direction. A second angled mirror 372 reflects the horizontal light beam 378 in a vertical direction to the light sensor assembly 368 after the light beam 378 passes, at least in part, through the fluid volume 374.

In the example velocity calibration station 358, the light source 366, the light sensor assembly 368, and the first and second mirrors 370, 372 are positioned below the top surface 376 of the velocity calibration station 358 (and/or the top surface of the cabinet 12 of FIG. 1A). Accordingly, the light beam 378 projected between the light source 366 and the light sensor assembly 368 is also below the surface 376. In some aspects, the dispensing assembly 314 may be controlled so that the dispensing nozzle 316 at least partially extends below the horizontal plane of the surface 376. Such a configuration in which these components are positioned below the surface 376 may present a smooth profile of the velocity calibration station 358, as well as protect the precise alignment between the light source 366 and the light sensor assembly 368 from hits or bumps.

Although the velocity calibration station 358 is depicted with the light source 366 and the light sensor assembly 368 in vertical orientation, it is contemplated that one or more of the light source 366 and the light sensor assembly 368 may be orientated horizontally. This horizontal orientation of the light source 366 and/or the light sensor assembly 368 may obviate the need for one or more of the first and second mirrors 370, 372. A horizontal arrangement may be preferable when the vertical depth within the cabinet 12 is limited.

FIG. 4 depicts an image 400 of a fluid volume 474, captured by a light sensor assembly, as the fluid volume 474 is dispensed from a dispensing nozzle. Specifically, the image 400 depicts a first representation 474a, second representation 474b, and third representation 474c of the fluid volume 474 at successive points in time. Such an image may be captured by an imaging assembly, such as that depicted in FIG. 3. Each of the representations 474a-c may correspond with a successive strobe of a light beam from a light source. During a strobe of light, the fluid volume 474 absorbs or attenuates some portion of that light, the remainder of which is sensed by a light sensor assembly, such as a camera. Thus, the presence of the fluid volume 474 in the light beam causes the shadow-like representations 474a-c seen in the image 400. The darker regions of the representations 474a—may be caused by some combination of a greater density of fluid in those regions or the overlap of the representations 474a-c.

The image 400 may be analyzed to determine one or more characteristics, such as the width, the length, and/or the two-dimensional shape, of the fluid volume 474 at each time point corresponding to the representations 474a-c. In some aspects, the characteristic values of each of the representations 474a-c may be averaged or otherwise aggregated since, as seen here, the characteristics of the fluid volume 474 may change over the stages of the dispensing process.

Further, a multi-representation image, such as the image 400, may prove particularly useful in determining the directionality of a fluid volume. The position of the fluid volume depicted in each representation may be recognized and a direction vector may be plotted using those position points. In the image 400, an approximate direction vector, indicated by the arrow 402, is determined based on the positions of the fluid volume 474 over the successive representations 474a-c.

FIG. 5 illustrates a top view of an example velocity calibration station 558 with two cameras. The velocity calibration station 558 includes an imaging assembly 562 and a receptacle 564, which are similar in some respects with the imaging assembly 62, 362 and the receptacle 64, 364 of FIGS. 2 and 3, respectively. The imaging assembly 562 and the receptacle 564 are positioned beneath the surface 576 of the velocity calibration station 558. Although in some aspects, the imaging assembly 562 (or portions thereof) and/or the receptacle 564 may be positioned above the surface 576 of the velocity calibration station 558.

The imaging assembly 562 is configured with two pairs of corresponding light sources and light sensor assemblies. That is, the imaging assembly 562 includes a first light source 566a and a first light sensor assembly 568a in opposing alignment. The imaging assembly 562 further includes a second light source 566b and a second light sensor assembly 568b in opposing alignment. The first pair of the first light source 566a and the first light sensor assembly 568a and the second pair of the second light source 566b and the second light sensor assembly 568b are oriented at ninety degrees from one another. In other words, the first light beam 578a projected from the first light source 566a to the first light sensor assembly 568a and the second light beam 578b projected from the second light source 566b to the second light sensor assembly 568b are normal to one another. Further, the two axes formed by the first light beam 578a and the second light beam 578b are perpendicular to the direction of travel of a fluid volume (not shown). In some aspects, the first pair of the first light source 566a and the first light sensor assembly 568a and the second pair of the second light source 566b and the second light sensor assembly 568b may be positioned at a relative angle other than ninety degrees (not shown). In other aspects, the imaging assembly 562 may comprise one or zero light sources (not shown). If the imaging assembly 562 comprises a single light source, the single light source may be aligned opposite one of the first light sensor assembly 568a or the second light sensor assembly 568b. Optionally, the single light source may be aligned with neither the first light sensor assembly 568a nor the second light sensor assembly 568b.

A fluid volume (not shown) is dispensed from a dispensing nozzle (not shown) such that the fluid volume passes through the intersection of the first light beam 578a and the second light beam 578b. The velocity calibration station 558 includes angled mirrors positioned above each light source and light sensor assembly to reflect the respective light beams projected therebetween. The first light beam 578a from the first light source 566a is reflected by a first mirror 570a to pass through the flight path of the fluid volume. Thereafter, the first light beam 578a is reflected by the second mirror 572a to the first light sensor assembly 568a after passing through the flight path of the fluid volume. The second light beam 578b from the second light source 566b is reflected by a first mirror 570b to pass through the flight path of the fluid volume. The second light beam 578b is then reflected by the second mirror 572b to the second light sensor assembly 568b after the second light beam 578b passes through the flight path of the fluid volume.

The first and second light beams 578a, 578b may be projected concurrently, either strobed or continuously. Yet in other aspects, the timing of the strobes of the first light beam 278a and the strobes of the second light beam 278b may be offset from one another.

The configuration of the two pairs of light sources and light sensor assemblies to capture images of the fluid volume may offer additional benefits to the configuration shown in FIG. 3. In particular, the configuration shown in FIG. 5 allows the fluid volume to be captured in images from two different perspectives or axes, which, in turn may allow a three-dimensional analysis or representation of the fluid volume. In some aspects, a three-dimensional model may be constructed based on the images from differing perspectives. The dual configuration of FIG. 5 may particularly afford improvements in the determination of the shape and directionality of the fluid volume. For example, the shape of the fluid volume may comprise a third dimensional aspect. Rather than a shape comprising only the length and the width of the fluid volume, the dual configuration may enable a third depth aspect of the shape representation. Similarly, the directionality of the fluid volume may be determined over two axes, rather than the single axis offered in a configuration with a single light sensor assembly.

In some aspects, the benefits of the dual configuration shown in FIG. 5 may be realized with the use of a single light sensor assembly equipped with optics to capture one or more images from different angles, including a perpendicular relative orientation or other angles. This light sensor assembly with optics configured to capture the one or more images may be used in conjunction with a single light source or with multiple light sources. For example, a light source may be positioned opposite one set of optics and a second light source may be positioned opposite another set of optics. In another example, two or more mirrors may be incorporated and arranged to each project a respective image to a single light sensor assembly. The two or more images may be captured by the light sensor assembly in a "split screen" fashion. Such a technique may allow the image sensor assembly to capture the two images from multiple different directions.

FIG. 6 illustrates a side view of an example velocity calibration station 658 according to an alternative embodiment. The velocity calibration station 658 may include a dispensing assembly 614 with a dispensing nozzle 616 configured to apply a volume of fluid 674 to a sample substrate 688. The volume of fluid 674 that is applied to the sample substrate 688 may be referred to as a fluid deposit 675 (or elsewhere as an applied fluid sample or the like). The flight path of the fluid volume 674 is indicated by the arrow 682 and the in-flight fluid volume 674 is shown over several progressive instances in ghost representation. A light sensor assembly 668 (e.g., a camera) may capture an image of the fluid deposit 675. The image of the fluid deposit 675 may be analyzed to determine one or more characteristics of the fluid deposit 675. In turn, the one or more characteristics of the fluid deposit 675 may be used to adjust an operating parameter of a dispensing device and other techniques disclosed herein.

The dispensing assembly 614, the fluid volume 674, and the light sensor assembly 668 may be similar in some aspects with the dispensing assembly 314, the fluid volume 374, and the image assembly 362 (e.g., the light sensor assembly 368) of FIG. 3, respectively.

In the embodiment shown in FIG. 6, the sample substrate 688 is positioned on or near the surface 676 of the velocity calibration station 658. the sample substrate 688 may be configured to move such that a series of fluid deposits may be successively applied to the sample substrate 688. The sample substrate 688 may be configured to move in a manner similar to that of a conveyer belt, although not necessarily in continuous motion. In the illustrated example, the sample substrate 688 is moves from right to left, as indicated by the arrows. The fluid deposits shown to the left of the instant fluid deposit 675 are those that were applied to the sample substrate 688 prior to the instant fluid deposit 675.

The sample substrate 688 may move intermittently and by a pre-determined distance. Each intermittent movement may follow (or proceed) an application of a fluid deposit to the sample substrate 688. Thus, after a movement of the sample substrate 688, the dispensing nozzle 616 may be in relative position to apply a fluid deposit to a fresh area of the sample substrate 688. The movement of the sample substrate 688 and corresponding application of a fluid deposit may be initiated by an operator or by an automatic process. For example, the dispensing system may determine that the dispensing nozzle 616 or other component is operating outside of a tolerance. As another example, the movement of the sample substrate 688 and/or corresponding application of a fluid deposit may be initiated at pre-determined time intervals. In an example, the dispensing assembly 614 may additionally or alternatively move in relation to the sample substrate 688, thus adjusting their relative positioning.

In an example, the sample substrate 688 may be made of a flexible material, such as a paper product or a flexible plastic. The flexible material may be fed from right to left by a source (not shown). The source may comprise a roll feed or other storage unit of the sample substrate 688. The sample substrate 688 with fluid deposits thereon may pass to the left in the illustration of FIG. 6 and, for example, proceed into a disposal receptacle.

In another example, the sample substrate 688 may be similar in some aspects to the substrate used in the production area 26 (FIG. 1A) and/or in production mode. For example, if the production substrate is a printed circuit board, the sample substrate 688 may be a similar printed circuit board, although not necessarily in the same component configuration. As another example, the sample substrate 688 may comprise a printed circuit board without any components. The sample substrate 688 may be positioned by an operator, for example.

In any of the various configurations and/or compositions, the sample substrate 688 or other sample substrates relating to FIG. 6 may refer to a substrate that is used primarily for calibration of the dispensing system and, in particular, the dispensing assembly 614 and/or the dispensing nozzle 616 thereof. The calibration may be with respect to the velocity at which fluid exits the dispensing nozzle 616 and other functions relating to the velocity. For example, use of the sample substrate 688 for calibration may be performed in the service station 28, as opposed to the production area 26 (FIG. 1A). Thus, the sample substrate 688 may be used in a service mode rather than a production mode.

The light sensor assembly 668, such as a camera, may be positioned above the sample substrate 688 to capture an image or other representation of the fluid deposit 675. For example, the light sensor assembly 668 may be coupled to, move in conjunction with, and/or comprise a part of the dispenser assembly 614, as is the case with the camera 20 and the dispensing assembly 14 of FIG. 1A. The light sensor assembly 668 may be positioned above at least a portion of the sample substrate 688. In some instances, the light sensor assembly 668 and/or the center axis of the light sensor assembly's 668 field of view may be angled relative to the flight path of the fluid volume 674, indicated as the arrow 682. Such an arrangement is shown in FIG. 6. Thus, the light sensor assembly 668 need not be positioned directly above the fluid deposit 684. In yet other instances, the light sensor assembly 668 may be positioned such that it is not directly above the sample substrate 688. The position of the light sensor assembly 668 may depend on the angle of the light sensor assembly 668 and/or the field of view of the light sensor assembly 668.

The direction at which the light sensor assembly 668 is pointed and/or the direction of the center of the light sensor assembly's 668 field of view is represented by an arrow 694. The direction of the arrow 694 (i.e., the direction of the light sensor assembly 668) may be angularly offset from the arrow 682 (i.e., the direction of the flight path) by an angle of 10 degrees or less. In another example, the angular offset between the arrow 694 and the arrow 682 may be 25 degrees or less. In yet another example, the angular offset between the arrow 694 and the arrow 682 may be 45 degrees or less.

In an example, the light sensor assembly 668 may not be angled with respect to the fluid deposit 675. That is, the light sensor assembly 668 and/or the arrow 694 may point in a direction parallel to the arrow 682. In this case, the field of view of the light sensor assembly 668 may be of sufficient width to capture an image of the fluid deposit 675. For example, the light sensor assembly 668 may be coupled to, move in conjunction with, and/or comprise a component of the dispensing assembly 614.

In another example, the light sensor assembly 668 may be positioned to point in a direction that is orthogonal to the flight path of the fluid volume 674 (i.e., the arrow 682). The light sensor assembly's 668 field of view in this configuration may be sufficiently wide to capture an image of the fluid deposit 675 from which one or more characteristics of the fluid deposit 675 may be determined. In this example, the light sensor assembly 668 may potentially capture both an image of the fluid deposit 675 and an image of the fluid volume 674 while it is in flight. Thus, one or more characteristics of the fluid deposit 675 and one or more characteristics of the fluid volume 674 while in flight may both be used in the calibration techniques described herein. For example, the value of an operating parameter of a dispensing device may be adjusted based on both the one or more characteristics of the fluid deposit 675 and the one or more characteristics of the fluid volume 674. A similar effect may be accomplished by configuring the velocity calibration station 658 with both the light sensor assembly 668 to capture an image of the fluid deposit 675 on the sample substrate 688 and an imaging assembly (e.g., the imaging assembly 62, 362, or 562 in respective FIG. 2, 3, or 5) to capture an image of the fluid volume 674 while in flight. For example, the imaging assemblies 62, 362, or 562 may be modified so that the lightbeam(s) are passed through the in-flight fluid volume while the fluid volume is above the substrate and/or surface of the velocity calibration station, rather than while the fluid volume is below the substrate and/or surface of the velocity calibration station.

The image of the fluid deposit 675 may be analyzed to determine one or more characteristics of the fluid deposit 675. The analysis may be performed by a controller (e.g., the controller 36 of FIG. 1A), for example.

Example characteristics may describe a dimensional aspect of the fluid deposit 675. For example, a characteristic of the fluid deposit 375 may include a first dimension of the fluid deposit 675, wherein the first dimension is parallel to the planar surface of the sample substrate 688 (e.g., a width of the fluid deposit 675). Another characteristic may include a second dimension of the fluid deposit 675 that is also parallel to the planar surface of the sample substrate 688 (e.g., a length of the fluid deposit 675). The first dimension and the second dimension may be orthogonal to one another. The first and second dimensions may together represent a width and a length of the fluid deposit 675. Another example characteristic may include a third dimension of the fluid deposit 675, wherein the third dimension is orthogonal to the planar surface of the sample substrate 688. The third dimension may represent a height of the fluid deposit 675 relative to the planar surface of the sample substrate 688. The height of the fluid deposit 675 may also indicate the coverage of the applied fluid. The height may be measured by the furthermost point of the fluid deposit 675 from the sample substrate 688. The various dimensions also may be used to determine a volume characteristic of the fluid deposit 675.

An example characteristic of the fluid deposit 675 may include a shape of the fluid deposit 675. Example shapes may include circular, oval, or elongated. The shape of the fluid deposit 675 (and determination thereof) may be analogous, in some aspects, with the shape of the fluid volume 674 (and determination thereof). The shape of the fluid deposit 675 may refer to the relative proportions and angles of the widths and lengths of the fluid deposit 675, as well as any contours or other features defining the periphery of the fluid deposit 675. The shape may be categorized according to one or more pre-defined shapes or characteristics, such as circular, oval, or elongated. If sufficient information is available for the fluid deposit 675, such as width, length, and height, the shape may be defined as a three-dimensional shape.

The shape of the fluid deposit 675 may be indicative of various characteristics of the fluid volume 674 while it is in flight, such as the directionality or shape of the fluid volume 674. For example, an elongated shape of the fluid deposit 675 may indicate a similar shape of the fluid volume 674. The elongated aspect of the example fluid deposit 675 may also indicate a directionality of the fluid volume 674 when in flight that corresponds with the elongated dimension of the fluid deposit 675.

When the fluid volume 674 impacts the sample substrate 688, small aerial droplets 690, sometimes colloquially referred to as "splatters," may be formed due to the impact. The aerial droplets 690 may land near the periphery of the fluid deposit 675 and form one or more satellites 692 on the sample substrate 688. Such aerial droplets 690 and resultant satellites 692 are generally considered undesirable. Although not strictly contiguous with the fluid deposit 675, the aerial droplets 690 and the satellites 692 may be considered as part of the fluid deposit 675 unless context clearly dictates otherwise.

The aerial droplets 690 and/or satellites 692 may be caused, among other reasons, by excessive velocity of the fluid volume 674 as it impacts the sample substrate 688. Thus, the characteristics of the fluid deposit 675 may include a numerical quantity of aerial droplets 690 and/or satellites 692. The characteristics of the fluid deposit 675 may also include the size (e.g., one or more dimensions) and/or shape of the aerial droplets 690 and/or satellites 692, which may be defined and determined in the same manner as the main portion of the fluid deposit 675 itself. The characteristics of the fluid deposit 675 may also include a relative distribution of the aerial droplets 690 and/or satellites 692 in relation to the main portion of the fluid deposit 675. A relative distribution may include the distance (e.g., a maximum, aggregate, and/or minimum) of the aerial droplets 690 and/or satellites 692 from the main fluid deposit 675. A relative distribution may also include the directionality of the aerial droplets 690 and/or satellites 692 relative to the fluid deposit 675. The directionality of the aerial droplets 690 and/or satellites 692 may be indicative of the directionality of the fluid volume 674 while it is flight. For example, if all or a majority of the aerial droplets 690 and satellites 692 are located to one side of the fluid deposit 675, this may indicate a corresponding directionality of the fluid volume 674 while it was in flight.

In some embodiments, the characteristic(s) of a fluid deposit on a substrate may be used in addition to the characteristic(s) of a fluid volume while it is flight. In other embodiments, the characteristic(s) of a fluid deposit on a substrate may be used in place of the characteristic(s) of a fluid volume while it is in flight. In this regard, the various aspects and uses of an in-flight volume of fluid are equally applicable to a fluid deposit on a substrate, unless clearly indicated otherwise by express statement or context.

In an alternative embodiment, a light sensor assembly 669 (in ghost representation) may be positioned below the sample substrate 688 and/or the surface 676 to capture an image of the fluid deposit 675 from below. In this embodiment, the sample substrate 688 may be made of a clear or semi-clear material so that aspects of the fluid deposit 675 may yet be captured. The surface 676 between the sample substrate 688 may be omitted, thus forming a hole or opening in the surface 676. Or this portion of the surface 676 may be clear. The light sensor assembly 669 and operation thereof may be otherwise similar in at least some aspects with the light sensor assembly 668.

FIG. 7 illustrates a flow diagram of a method 700 for a closed loop calibration process to achieve a preferred value (or range thereof) of a fluid volume characteristic by iteratively performing a measurement of said characteristic and adjusting a velocity-affecting operating parameter of a dispensing system (e.g., the dispensing system 10 of FIG. 1A). The method 700 may be performed, at least in part, by a controller (e.g., the controller 36).

At step 702, the method 700 of calibrating a dispensing device (e.g., the dispensing system 10 and/or the dispensing assembly 14 of FIG. 1A) for dispensing viscous fluid commences. The dispensing device may have a nozzle with a valve (e.g., the dispensing nozzle 16) and may be operated by the controller.

At step 704, the dispensing device may dispense a first volume of viscous fluid from the nozzle of the dispending system. The dispensing device may dispense the first volume of fluid by opening and closing the valve of the nozzle. The first volume of fluid may be dispensed according to a first value(s) of one or more operating parameters that affect the exit velocity of the first volume of fluid from the nozzle. Said operating parameter(s) may be an operating parameter of the dispensing assembly, the dispensing nozzle, and/or the dispensing system (or other component thereof).

As noted, the operating parameter may materially affect the velocity of a volume of fluid as it is dispensed from the dispensing nozzle. An example of a velocity-affecting operating parameter may be associated with a moveable element (e.g., a needle, valve stem, or the like) configured to engage a valve seat to dispense a volume of fluid. The movable element 260 and the valve seat 252 of FIG. 1B provide examples of the aforementioned movable element and valve seat. Example operating parameters associated with a movable element may include a speed of the movable element as it engages the valve seat, a reciprocation cycle time of the movable element, a stroke length of the movable element, and/or an impact force of the moveable element as it engages the valve seat. Another example operating parameter may relate to a spring or other biasing element operatively connected to the moveable element and/operatively connected to an actuator, such as a compression or tensile strength of the spring and/or a travel of the spring. The biasing element 268 of FIG. 1B and the spring of FIG. 1C provide examples. Yet another example operating parameter may relate to an actuator, such as the piezoelectric drive module 216 of FIGS. 1B and 1C, configured to cause movement or reciprocation of the movable element. Thus, such an operating parameter may comprise an actuation timing, a reciprocation cycle timing, and/or a stroke length of the actuator. Other operating parameters relating to the actuator may include the speed of the actuator component that directly or indirectly causes the movable element to move towards or away from the valve seat and the force directly or indirectly conveyed by the actuator to the movable element.

Dispensing the volume of fluid, as well as other portions of the method 700, may be performed at a velocity calibration station within a service area of a cabinet (e.g., the velocity calibration station 58 within the cabinet 12, respectively, of FIG. 1A). When the dispensing device is located within the service area, the dispensing device may be considered as operating in a service mode. In cases in which the volume of fluid is dispensed at the velocity calibration station, the volume of fluid may be received by a receptacle (e.g., the receptacle 64 of FIG. 2) for later disposal.

In another example, the volume of fluid may be applied to a sample substrate (e.g., the sample substrate 688 of FIG. 6). The sample substrate, and the applied sample volume of fluid (e.g., the fluid deposit 675 of FIG. 6) in particular, may be positioned in view of a light sensor assembly (e.g., the camera 20 of FIG. 1A and/or the light sensor assembly 668 of FIG. 6). For example, the light sensor assembly may be positioned above the applied sample, either directly or offset. The light sensor assembly positioned above the applied sample may be angled towards the applied sample to accommodate for any offset. In another example in which the light sensor assembly is offset from the position directly above the applied sample, the applied sample may be within the field of view of the light sensor assembly.

As another example, the light sensor assembly for capturing an image of the applied sample may be positioned approximately horizontal with the applied sample. In this instance, the horizontal light assembly for capturing the applied sample may be in addition to the imaging assembly for capturing the image of the volume of fluid while it is in flight. The imaging assembly for capturing the image of the in-flight volume of fluid may be positioned above the substrate, in which case the below receptacle may be omitted. In yet another example, an image of the applied sample of fluid may be captured by the same imaging assembly as that used to capture the image of the volume of fluid while it is in flight. In such an arrangement, this imaging assembly may also be positioned above the substrate.

In other aspects, the dispensing operation and/or other steps of the method 700 may be performed in a production mode in which the dispensing device is positioned within the production area and performs dispensing operations directed to a customer product. Thus, at least some of the operations of the method 700 may be performed in situ while the dispensing device deposits fluid volumes to a customer product. The production mode may allow real-time adjustment of the velocity and/or other characteristics of the volume of fluid.

At step 706, a characteristic of the volume of fluid dispensed from the dispensing nozzle may be measured by a sensor. The sensor may be realized, at least in part, by an imaging assembly comprising a light sensor assembly and/or a light source (e.g., the imaging assembly 362, the light sensor assembly 368, and the light source 366, respectively, of FIG. 3). A camera may serve as the light sensor assembly, for example. The light sensor assembly may be paired with the light source, as illustrated in FIGS. 3 and 5, for example.

Additionally or alternatively, the characteristic of the volume of fluid may comprise a characteristic of the volume of fluid after it is applied to the substrate (e.g., the fluid deposit 675 of FIG. 6 and/or the applied fluid sample referred to above in relation to the step 704).

A characteristic of the volume of fluid may include a width, length, shape, directionality, and/or velocity of the fluid volume. A characteristic of the volume of fluid may further include the presence of aerial droplets and/or satellites (e.g., the aerial droplets 690 and the satellites of FIG. 6) and attributes thereof. In aspects in which multiple images or other representations of the fluid volume may be captured, such as a case in which a strobed light beam is used, a characteristic value may be determined for each of the multiple images or other representations. These multiple characteristic values may be averaged or otherwise aggregated to determine a composite characteristic value of the fluid volume. The multiple characteristic values may also be used to determine a standard deviation thereof. Likewise, in aspects in which a "volume of fluid" comprises a sample of multiple successive fluid volumes, the characteristic may be measured for each of the fluid volumes of the sample and the corresponding multiple characteristic values may be averaged, aggregated, or used to determine a standard deviation.

The width of the fluid volume may refer to a generally horizontal dimension of the fluid volume, such as the dimension of the fluid volume that is perpendicular to the direction of travel of the fluid volume. In aspects in which the sensor is configured to image or measure the fluid volume from multiple perspectives, the width measured from each perspective may vary. For example, a fluid volume with an oval-shaped horizontal cross-section may yield different width values depending on which perspective is measured. The multiple width measurements for different perspectives may facilitate a two-dimensional width measurement, which, in turn may facilitate a three-dimensional representation of the fluid volume as a whole.

The length of the fluid volume while in flight may refer to the generally vertical dimension of the fluid volume, such as the dimension that is parallel to the direction of travel of the fluid volume.

The shape of the fluid volume may refer to the relative proportions and angles of the widths and lengths of the fluid volume, as well as any contours or other features defining the periphery of the fluid volume. The shape may be categorized according to one or more pre-defined shapes or characteristics, such as tear-drop, oval, oblong, and/or circular. In aspects in which the fluid volume is imaged or measured from a single perspective, the shape of the fluid volume may be expressed as a two-dimensional shape. In particular, the two-dimensional shape may be expressed as the horizontal width(s) and vertical length(s) of the fluid volume in a plane perpendicular to the direction of light received by the light sensor assembly. In aspects in which the fluid volume is imaged or measured from multiple perspectives, the shape of the fluid volume may be expressed as a three-dimensional shape, such as a three-dimensional model or other representation.

The directionality of the fluid volume may refer to the direction of travel of the fluid volume as it leaves the dispensing nozzle, either while in flight between the dispensing nozzle and the customer product and/or after the fluid volume impacts a substrate. The directionality of the fluid volume after impacting the substrate may refer to a relative distribution of splatters and/or satellites from the main body of the applied fluid volume. The directionality of the fluid volume may be expressed as the number of degrees offset from a vertical axis running from the dispensing nozzle to the corresponding point of the customer product (i.e., the hypothetical direction of travel of the fluid volume in the absence of the actual divergent directionality of the fluid volume). Additionally or alternatively, the directionality of the fluid volume may be measured along a horizontal axis perpendicular to the just-described vertical axis or hypothetical direction of travel. In aspects in which the fluid volume is imaged or measured from more than one perspective, the directionality may be measured along two or more axes perpendicular to the just-described vertical axis or hypothetical direction of travel. FIG. 4 depicts an example fluid volume with a directionality, indicated by the arrow 402, deviating from the vertical axis between the dispensing nozzle and the customer product.

In some aspects, two or more characteristics of the fluid volume may be measured instead of a single characteristic. For example, both the width and the length of the fluid volume may be measured. The two or more characteristics may comprise one or more characteristics of the fluid volume while it is on flight and one or more characteristics of the fluid volume after it is applied to a substrate. For example, the two or more characteristics may comprise a width of the fluid volume while it is in flight and a width of the fluid volume after it is applied to a substrate.

The two or more characteristics may form the basis of a single composite characteristic, which may then be used as the "characteristic of the volume of fluid" in the method 700. A composite characteristic may include a proportional characteristic of the dimensions of the fluid volume, as an example. A length-to-width ratio may be determined based on the width and the length characteristics of the fluid volume. A maximum diameter of the fluid volume (e.g., one determined from two-dimensional horizontal cross-sections of the fluid volume) and a maximum length of the fluid volume (e.g., one determined from two-dimensional vertical cross sections of the fluid volume) may be used to determine a maximum length-to-maximum diameter ratio of the fluid volume. A symmetry characteristic may represent another example of a composite characteristic. The symmetry characteristic may be determined based on two or more width characteristics taken from different perspectives. The different perspectives may be horizontally offset by ninety degrees, for example. The symmetry characteristic may be further based on the directionality characteristic of the fluid volume. By equating the directionality of the fluid volume with the elongate central axis of the fluid volume, the relative widths of the fluid volume may be used to determine if the fluid volume is symmetrical about its elongate central axis.

At step 708, the measured value of the characteristic of the volume of fluid may be compared with a value or range of values of the characteristic. The value or range of values may be a preferred value or range of values of that characteristic. For example, a particular implementation of a dispensing operation may require a fluid volume with a width value between 1 mm and 2 mm. A measured width characteristic of 1.5 mm for an example volume of fluid may be compared to the range of values between 1 mm and 2 mm.

In a case in which a characteristic value cannot be readily expressed as a numerical value, such as a shape of a fluid volume, the range of values may be expressed as one or more shapes and/or attributes relating to shape. For example, a range of values for a shape characteristic may include the values "tear-drop; oval." If the characteristic value of an instant fluid volume is categorized as one or more of (or both, depending on the particular implementation) tear-drop and oval, the characteristic value of the instant fluid volume may be considered as falling within the value range.

At step 710, a determination may be made, based on the comparison of step 708, as to whether the characteristic value of the dispensed volume of fluid is within the range of values. If the characteristic value of the dispensed volume of fluid is not within the range of values ("NO"), the method may proceed to step 712. If otherwise ("YES"), the method may proceed to step 714 at which the method 700 is concluded. Further, if the characteristic value of the dispensed volume of fluid is within the range of values, an indicator, such as a visual or audio indicator, may be provided. The indicator may be perceived by an operator to prompt the operator to enter the dispensing assembly back to a production mode.

At step 712, the first value of the operating parameter, according to which the first volume of fluid was dispensed in step 704, may be adjusted to a second value of the operating parameter. It will be recalled that the operating parameter may relate to the dispensing assembly, the dispensing nozzle, or the dispensing system (or component thereof). It will be further recalled that the operating parameter may materially affect the velocity of a fluid volume as it exits the dispensing nozzle. The adjustment of the operating parameter may cause the velocity of a subsequent volume of fluid to increase or decrease relative to the velocity of the previously-dispensed volume of fluid.

The adjustment of the value of the operating parameter may be based on the comparison of the characteristic value of the dispensing fluid volume with the range of characteristic values in step 708, besides the determination of whether the characteristic value of the fluid volume is within the range of characteristic values. For example, the adjustment of the operating parameter may be based on whether the characteristic value of the fluid volume is greater than or less than the range of values.

Further, the adjustment of the operating parameter may be based on a difference between the characteristic value of the fluid volume and the nearest value of the range of values. That is, the adjustment may be based on a quantitative value needed to bring the characteristic value of the fluid volume within the range of values.

Additionally, the adjustment may be based on a relationship (e.g., a proportional relationship) between the operating parameter and the fluid volume exit velocity. In other words, the degree to which an operating parameter is changed causes a proportional change in a fluid volume velocity. The adjustment to the operating parameter may be based on this proportional relationship.

Further, the adjustment to the operating parameter may be based on a proportional relationship between a fluid volume velocity and a characteristic value of the volume of fluid. For example, a desired characteristic value or a desired quantitative change to the characteristic value may form a basis for a determination of a change in fluid volume velocity. The determined change in fluid volume velocity may then form a basis for determining an adjustment of the operating parameter.

Subsequent to the adjustment of the first value of the operation parameter, a portion of the method 700 may be restarted at step 704 in a second iteration of the portion of the method 700. The second iteration of step 704 may be performed using the adjusted first value of the operating parameter resulting from execution of step 712. In the second iteration of step 704, the dispensing device may dispense a second volume of viscous fluid from the nozzle of the dispensing system. The dispensing device may dispense the second volume of fluid via opening and closing the valve of the nozzle of the dispensing device. The second volume of fluid may be dispensing according to a second value(s) of the one or more operating parameters.

The second iteration may proceed through steps 706-710 and, if appropriate, step 712. Further iterations of steps 704-710 and, if again appropriate, step 712 may be performed until the value of the characteristic of the volume of fluid is within the range of values.

At step 710, if the value of the characteristic of the volume of fluid is within the range of values of the characteristic, the method 700 may continue to step 714. At step 714, the method 700 is ended. Optionally, the method 700 may be reinitiated but directed, instead, to a different characteristic of the volume of fluid to be dispensed from the dispensing device. After the method 700 ends, the dispensing device may be returned to production mode and repositioned in the production area of the cabinet. In the production mode and when correctly positioned within the production area, the dispensing device may proceed to dispense volumes of fluid to a customer product, such as a substrate. Preferably, the volumes of fluid possesses the desired value of the characteristics to which the method 700 was directed.

The various measurements and corresponding processes disclosed herein (and any related data) may be stored for later analysis. For example, statistical analysis may be performed on such data for process improvements or product traceability.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is not intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is not intended that an order be inferred, in any respect.

It will be apparent to those skilled in the art that various modifications and variations may be made without departing from the scope or spirit of this application. Other embodiments will be apparent to those skilled in the art from consideration of the specification and practice disclosed herein.

What is claimed is:

1. A method of calibrating a dispensing device for dispensing viscous fluid, the dispensing device having a nozzle with a valve and being operated by a controller, the method comprising:
    opening and closing the valve to dispense a first volume of viscous fluid from the nozzle according to a first value of an operating parameter, wherein the first value of the operating parameter affects an exit velocity of the first volume;
    measuring, using a sensor, a characteristic of the first volume of viscous fluid dispensed from the nozzle, wherein the characteristic of the first volume includes at least one of a shape, a directionality, and a presence of one or more satellites of viscous fluid associated with the first volume;
    comparing the characteristic of the first volume to a range to determine whether the characteristic of the first volume is outside of the range; and
    in response to a determination that the characteristic of the first volume is outside of the range, (a) adjusting the first value of the operating parameter to a second value and (b) dispensing a second volume of viscous fluid from the dispensing device according to the second value of the operating parameter, wherein the exit velocity of the second volume of viscous fluid from the nozzle is different from the exit velocity of the first volume of viscous fluid from the nozzle.

2. The method of claim 1, wherein the dispensing device includes a moveable element configured to engage a valve seat to dispense the first volume, and wherein the operating parameter is associated with at least one of the moveable element, a spring operatively connected to the moveable element, and an actuator configured to cause movement of the movable element.

3. The method of claim 1, wherein the opening and closing of the valve occurs during movement of the nozzle and the volumes of viscous fluid are discontinuous.

4. The method of claim 1, wherein the sensor comprises a camera configured to capture an image of the first volume.

5. The method of claim 4, wherein the measuring the characteristic of the first volume of viscous fluid comprises:
    strobing a light source and capturing, using the camera, two or more time-offset images of the first volume.

6. The method of claim 5, wherein the characteristic of the first volume is velocity.

7. The method of claim 1, wherein the sensor comprises at least one camera configured to capture an image from two angles.

8. The method of claim 1, wherein
    the opening and closing step comprises applying the first volume of viscous fluid to a first substrate; and
    the dispensing step comprises dispensing the second volume of viscous fluid from the dispensing device to apply the second volume of viscous fluid to at least one of the first substrate and a second substrate.

9. The method of claim 8, wherein the sensor is positioned vertically above the first volume and at a horizontal offset from a vertical axis of the first volume.

10. The method of claim 9, wherein a center axis of a field of view of the sensor is angled relative to a vertical axis of the first volume.

11. The method of claim 9, wherein a center axis of a field of view of the sensor is parallel to a vertical axis of the first volume.

12. The method of claim 8, wherein the sensor comprises a first camera and a second camera, wherein the first camera is configured to measure the characteristic of the first volume applied to the first substrate and the second camera is configured to measure a characteristic of the first volume before being applied to the first substrate, wherein the method further comprises:
    measuring, using the second camera, a characteristic of the first volume before being applied to the first substrate; and
    comparing the characteristic of the first volume before being applied to the first substrate to a second range to determine whether the characteristic of the first volume before being applied to the first substrate is outside of the second range,
    wherein the adjusting the first value of the operating parameter to the second value is further in response to a determination that the characteristic of the first volume before being applied to the first substrate is outside of the second range.

13. The method of claim 8, wherein the first volume is located at a first position on the first substrate and the second volume is located at a second position on the first substrate.

14. The method of claim 1, wherein the characteristic of the first volume comprises at least one of a relative positioning of the one or more satellites and the first volume, a numerical quantity of satellites, a dimensional aspect of a satellite of the one or more satellites, and a shape of a satellite of the one or more satellites.

15. A dispensing system comprising:
    a sensor arranged to measure a characteristic of a volume of viscous fluid dispensed by a dispensing device, the sensor including a camera configured to capture one or more images of the volume of viscous fluid; and a controller configured to calibrate the dispensing device by generating one or more signals to:
  open and close a valve of the dispensing device to dispense a first volume of viscous fluid from the dispensing device according to a first value of an operating parameter, wherein the first value of the operating parameter affects an exit velocity of the first volume;
  generate information concerning a characteristic of the first volume of viscous fluid dispensed from the dispensing device using the sensor by (a) generating one or more signals to strobe a light source and capture, using the camera, two or more time-offset images of the first volume and/or (b) generating one or more signals to capture, using the camera, an image from two angles;
  compare the information concerning the characteristic of the first volume to a range to determine whether the characteristic of the first volume is outside of the range; and
  in response to a determination that the characteristic of the first volume is outside of the range, (a) adjust the first value of the operating parameter to a second value and (b) dispense a second volume of viscous fluid from the dispensing device according to the second value of the operating parameter, wherein the exit velocity of the second volume of viscous fluid from the dispensing device is different from the exit velocity of the first volume of viscous fluid from the dispensing device.

16. The dispensing system of claim 15, further comprising:
  a production area comprising a customer product; and
  a service area comprising the sensor;
  wherein the controller is further configured to generate a second one or more signals to:
    move the dispensing device to the production area to dispense volumes of viscous fluids onto the customer product; and
    move the dispensing device to the service area to generate the information concerning the characteristic of the first volume using the sensor.

17. The dispensing system of claim 15, wherein the characteristic of the first volume is velocity.

18. A method of calibrating a dispensing device for dispensing viscous fluid, the dispensing device having a nozzle with a valve and being operated by a controller, the method comprising:
  opening and closing the valve to dispense a first volume of viscous fluid from the nozzle according to a first value of an operating parameter and applying the first volume of viscous fluid to a first substrate, wherein the first value of the operating parameter affects an exit velocity of the first volume;
  measuring a characteristic of the first volume applied to the first substrate;
  measuring a characteristic of the first volume before being applied to the first substrate;
  comparing the characteristic of the first volume applied to the first substrate to a first range to determine whether the characteristic of the first volume applied to the first substrate is outside of the first range;
  comparing the characteristic of the first volume before being applied to the first substrate to a second range to determine whether the characteristic of the first volume before being applied to the first substrate is outside of the second range; and
  in response to a determination that the characteristic of the first volume applied to the first substrate is outside of the first range and a determination that the characteristic of the first volume before being applied to the first substrate is outside of the second range, (a) adjusting the first value of the operating parameter to a second value and (b) dispensing a second volume of viscous fluid from the dispensing device according to the second value of the operating parameter and applying the second volume of viscous fluid to at least one of the first substrate and a second substrate, wherein the exit velocity of the second volume of viscous fluid from the nozzle is different from the exit velocity of the first volume of viscous fluid from the nozzle.

* * * * *